Patented Apr. 17, 1923.

1,451,850

UNITED STATES PATENT OFFICE.

HUGH McCURDY SPENCER, OF NEWARK, NEW JERSEY, ASSIGNOR, BY MESNE ASSIGNMENTS, TO SEYDEL CHEMICAL COMPANY, OF NEW YORK, N. Y., A CORPORATION OF NEW JERSEY.

MERCURIAL COMPOSITION.

No Drawing. Application filed November 29, 1921. Serial No. 518,644.

*To all whom it may concern:*

Be it known that I, HUGH MCCURDY SPENCER, a citizen of the United States, residing at 220 Roseville Ave., Newark, N. J., in the county of Essex, State of New Jersey, have invented certain new and useful Improvements in Mercurial Composition; and I do hereby declare the following to be a full, clear, and exact description of the invention, such as will enable others skilled in the art to which it appertains to make and use the same.

This invention relates to an improved composition of matter containing mercury and to a method of preparing the same and has for its principal object the preparation of a mercurial composition adapted for intravenous injection into the animal organism.

The improved product of this invention is useful as a remedy in the treatment of certain diseases of the living human organism and particularly in the treatment of syphilis by intravenous injection.

The mercurial compositions hitherto in common use in the treatment of syphilis are adapted for administration in accordance with several different well recognized methods, namely; the oral, the intramuscular and the method of inunctions. None of these compositions are suitable for intravenous injection. I am aware, however, that soluble salts of mercury in very minute quantities have been proposed hitherto for intravenous injection, but I have found that the use of compositions of this character in connection with the intravenous method of administration is very hazardous and often extremely dangerous, and a dose of mercury which can be so administered in this form is too minute and too quickly eliminated to give satisfactory results.

I am also aware that hitherto a few mercury containing compositions, more or less colloidal in nature, have been prepared which were used experimentally for intravenous injection but these old compositions were extremely toxic particularly when the total amount of mercury administered in these forms is comparable with or even approaches in amount that administered in accordance with the present invention. Furthermore they contained insufficient mercury to accomplish the beneficial results that are obtained by means of my improved mercurial composition, or were unstable solutions or possessed some other objectionable property such as the property of producing mercurialism, anaphylaxis, hemolysis, embolism or other dangerous effects after intravenous injection into the animal organism.

The toxicity of these older compositions is due to the presence of varying amounts of soluble mercury compounds, or compounds which become soluble during use.

While certain of these older products are prepared from socalled insoluble forms of mercury, nevertheless, as a matter of fact, they do contain amounts of soluble mercury which produce highly objectionable effects when intravenously injected.

Thus, for example, mercury compounds in which the mercury is bound in a chemical or quasi-chemical sense with an organic substance of great molecular weight such as nucselic acid have been suggested for intravenous injection but I have found that mercurials of this character are highly toxic and frequently produce anaphylaxis after introduction into the blood stream and in general are no improvement over compositions containing minute amounts of the soluble inorganic salts of mercury for use in connection with intravenous injection.

I have found that the very dilute solutions of the soluble salts of mercury are far too toxic for safe administration frequently causing mercuralism and furthermore I have found that the remedial effects of such solutions are altogether temporary and uncertain for use in connection with intravenous injection.

The present invention provides a mercurial which does not possess the foregoing disadvantages and which is therefore admirably suited for use in intravenous administration. The improved mercurial of the present invention is prepared from pure, non-toxic metallic mercury and certain other substances adapted for intravenous injection which serve as the medium in which the metallic mercury is incorporated. The mercury is incorporated in a finely divided condition in the medium in relatively high concentration. The medium itself is readily assimilable by normal blood since it is non-toxic and contains no anaphylactogenic or other substances which produce injurious effects, when introduced into the blood stream. More specifically, for this medium I use preferably a soluble or partially soluble carbohydrate (such as gum acacia, glucose or pure partially hydrolyzed starch) and this may be compounded with a soluble basic substance such as caustic soda. In the preferred form the improved product of the present invention contains the comminuted pure metallic mercury disseminated or dispersed in a powdered or thick pasty or semisolid medium. In this powdered or semisolid form the product can be conveniently transported or stored without danger of deterioration and is conveniently prepared for intravenous injection by merely adding (aseptically) pure sterile water in the proper proportion. But the product may be prepared in other forms such as in the form of a liquid or colloidal solution containing the essential ingredients as described above. In the form of a liquid suspension or colloidal solution, however, the product does not have the keeping qualities that it possesses in the form of a dry solid or powdered form since the mercury is apt to agglomerate or separate from the liquid on standing and it is then not so suitable for use or it may even be entirely unsuited for use for intravenous administration.

It will be understood that in using the product in the solid form a suitable amount of it must first be taken up in sterile water usually about 100 c. c. or less. The sterile colloidal solution or suspension of metallic mercury thus obtained may be injected after sterilization (or without further treatment if already sterile) directly into the blood stream. The colloidal solution or suspension of metallic mercury of the present invention prepared for example in the manner specified in the preceding paragraph is highly concentrated with respect to mercury and at the same time possesses sufficient stability to enable the operator to inject the solution into the blood stream before the mercury begins to separate from the liquid. In fact this concentrated fluid mixture or colloidal solution may be allowed to stand for one or even for two hours before any considerable amount of mercury separates, notwithstanding the fact that the solution contains sometimes as much as 60 mg. or more of finely divided or colloidally dispersed metallic mercury per 100 c. c. of liquid.

At the same time the improved product, as previously stated, is also non-toxic and slightly basic and does not produce either a state of acidosis or thrombosis of the vein after introvenous injection even in doses containing 20 mg. to 60 mg. of mercury or more.

Having described the main general features and characteristics of my invention, I shall now give a few specific examples of my improved product and method of compounding the same. It is to be understood, however, that my invention is not restricted to the details given in these examples but that they are given merely by way of illustrating a few embodiments of the invention.

*Example I.*—Mix aseptically 1000 g. of sterile partially hydrolyzed starch with 1 g. of pure sterile metallic mercury and 30 g. of pure sterile solid caustic soda and triturate this mixture mechanically in a sterile non-metallic mortar with sterile non-metallic pestle. This will give a semi-solid mercurial composition which may be stored and transported without danger of serious deterioration. Approximately 10 g. of this powdered mixture constitutes a single dose and this amount may be measured out and taken up aseptically in 100 c. c. of pure sterile distilled water just prior to intravenous injection.

*Example II.*—Mix aseptically 10 g. of chemically pure sterile dextrose with 30 mg. to 60 mg. of pure sterile metallic mercury and 0.16 g. of sterile pure solid sodium hydroxide. Thoroughly triturate this mixture aseptically with enough water to produce a stiff paste in a sterile non-metallic mortar by means of sterile pestle, or in any other convenient manner until the constituents are thoroughly admixed. This will give a powdered or semi-solid mercurial composition which may be stored and transported without danger of serious deterioration and which just prior to intravenous injection may be aseptically taken up in 100 c. c. of pure sterile distilled water.

*Example III.*—Mix 50 g. of partially hydrolyzed starch with 500 mgs. of pure metallic mercury and triturate for one half hour in a sterile non-metallic mortar with sterile non-metallic pestle. Sterilize the mixture. Measure out aseptically 10 g. of the mercury dextrose mixture and thoroughly disperse by agitation or stirring in 100 c. c. of distilled water. Now add .75 c. c. of a normal solution of chemically pure, sterilized sodium hydroxide to each 100 c. c. of the colloidal solution of mercury.

*Example IV.*—Mix aseptically 10 g. of chemically pure sterile dextrose with 30 mg. to 60 mg. of pure sterile metallic mercury. Add .75 of a c. c. of normal chemically pure sodium hydroxide solution. Add one c. c. of distilled water. Triturate this mixture thoroughly in a mortar or mechanically, then sterilize. This will give a semi-solid mixture or paste which may be stored and transported without danger of serious deterioration and which may be conveniently taken up in 100 c. c. of pure sterile distilled water just prior to intravenous injection.

*Example V.*—Mix aseptically 1000 g. of pure sterile gum acacia and 20 g. of pure sterile metallic mercury and 9.99 g. pure sterile solid NaOH or 299.7 g. pure sterile NaCl, by means of a rotating non-metallic pebble mill. The mixing operation preferably should be continued for several days until the components are thoroughly admixed and the mercury and NaCl disseminated throughout the gum. This will give a powdered or semi-solid mercurial composition which may be stored and transported without danger of serious deterioration. Approximately 3 g. of this powdered mixture constitutes a dose and this amount may be taken up aseptically in 100 c. c. of pure sterile distilled water and injected intravenously whilst in a fluid condition.

It will be understood that I may substitute for dextrose in examples II and IV, and for the starch in examples I and III, an approximately equal weight of gum acacia and also in example V, I may substitute either dextrose or partially hydrolyzed starch for the gum acacia, without departing from the scope of my invention.

I claim:

1. A mercurial preparation for intravenous injection comprising mercury which is present entirely in the pure metallic state and a water soluble medium capable of holding the mercury in a dispersed condition and capable on addition of water of forming a liquid assimilable by and isotonic with normal blood.

2. A mercurial composition for intravenous injection comprising mercury which is present entirely in the pure metallic state and a substantially soluble carbohydrate medium capable of holding the mercury in a dispersed condition and capable on addition of water of forming a liquid assimilable by and isotonic normal blood.

3. A mercurial composition comprising pure metallic mercury dispersed in a water soluble medium, which composition when mixed with water in such proportion as to give a mixture containing more than about 5 mg. of dispersed mercury to each 100 c. c. of water yields a liquid isotonic with and assimilable by normal blood.

4. A mercurial composition comprising pure metallic mercury dispersed in gum acacia which composition when mixed with water in such proportion as to give a mixture containing more than about 5 mg. of dispersed mercury to each 100 c. c. of water yields a liquid isotonic with normal blood.

5. A mercurial composition comprising mercury which is present entirely in the pure metallic state and gum acacia, and which composition when diluted with water yields a liquid containing the metallic mercury dispersed in stable state therein and which is isotonic toward normal blood when the dilution corresponds to a concentration of dispersed metallic mercury greater than about five milligrams of mercury to 100 c. c. of liquid.

In testimony whereof I affix my signature.

HUGH McCURDY SPENCER.